Patented Nov. 26, 1946

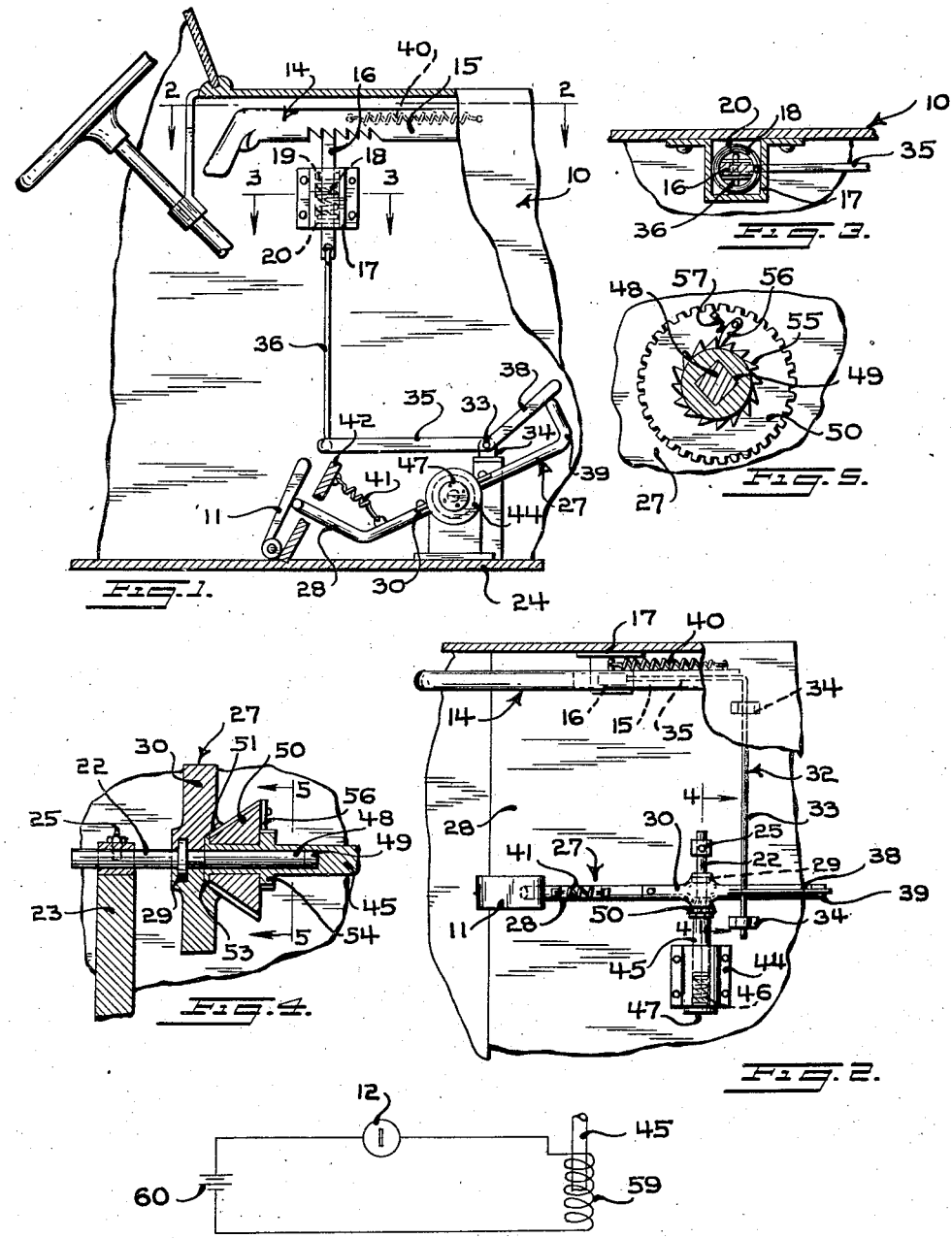

2,411,632

UNITED STATES PATENT OFFICE 2,411,632

AUTOMATIC EMERGENCY BRAKE RELEASE
FOR MOTOR VEHICLES

Harold Moran, Lincoln Park, N. J.

Application June 16, 1945, Serial No. 599,874

8 Claims. (Cl. 192—3)

This invention relates to new and useful improvements in an automatic emergency brake release.

More specifically the invention proposes an automatic emergency brake release for a motor vehicle having a depressible accelerator pedal, an emergency brake, and an ignition switch. It is proposed to characterize the new brake release by a mechanism for releasing the emergency brake when the accelerator pedal is depressed. It is proposed to associate latching means with the accelerator pedal to normally latch it in a raised position so that it cannot be depressed. Solenoid controlled means is also provided for releasing said latching means when the ignition switch is turned on.

The automatic emergency brake release will avoid mishaps in the operation of a motor vehicle. It will prevent the operator from forgetting to release the emergency brake and drive the car with the brake on causing damage to the braking system. It will eliminate the bother and the necessity of the operator of releasing the brake. It will prove of exceptional advantage in emergencies when the operator becomes engrossed in conversation or for other reasons forgets to release the brake.

An important feature of the invention resides in the fact that the accelerator pedal will be latched in a raised position, so that children playing in the vehicle cannot accidently release the emergency brake and cause the vehicle to run wild.

Still further the invention proposes a certain desirable construction for an automatic emergency brake release, which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary longitudinal sectional view of a motor vehicle equipped with an automatic brake release constructed in accordance with this invention.

Fig. 2 is a fragmentary horizontal sectional view taken on the line 2—2 of Fig. 1.

Fig. 3 is a fragmentary enlarged horizontal sectional view taken on the line 3—3 of Fig. 1.

Fig. 4 is a fragmentary enlarged transverse sectional view taken on the line 4—4 of Fig. 2.

Fig. 5 is a vertical sectional view taken on the line 5—5 of Fig. 4.

Fig. 6 is a schematic wiring diagram of the device.

The automatic emergency brake release in accordance with this invention is used in combination with a motor vehicle generally indicated by the reference numeral 10. This motor vehicle is provided with a depressible accelerator pedal 11 as generally known and used at the present time for controlling the gasoline supplied to the motor of the vehicle. The details of this pedal and connections will not be given in this application since it forms no part of the invention. This motor vehicle 10 is also provided with the usual ignition lock switch 12 which is schematically illustrated in Fig. 6 because it also is a general and well known part in motor vehicles. The vehicle 10, is provided with a standard, or customary emergency brake 14 which may be of any design and construction provided it includes a ratchet tooth member 15 engageable by a bolt 16 for holding the brake set. This arrangement is also standard in construction, and will not be shown in detail.

The bolt 16 is slidably mounted through a bolt housing 17 which is mounted upon the side wall of the vehicle 10. An expansion spring 18 is contained within the housing 17. This expansion spring acts between a pin 19 mounted through the bolt 16 and a washer 20 rested against the bottom wall of the housing 17. The spring 18 acts to resiliently urge the bolt 16 against the ratchet tooth member 15.

The stationary horizontal rod 22 is arranged transversely of and to the front of the accelerator pedal 11. This rod 22 is mounted in and projects from a standard 23 rested on the floor 24 of the motor vehicle 10. A cap screw 25 is mounted on the standard 23 and fixedly supports the horizontal rod 22.

A lever 27 is pivotally mounted on the rod 22 and extends forwards and rearwards. The front end 28 of the lever 27 engages against the bottom face of the accelerator pedal 11. The lever 27 engages about a flange 29 formed or mounted on the rod 22 by which the lever 27 is non-slidably mounted on the rod. The lever 27 has a removable top section 30 which when removed frees the lever 27 so that it may be removed from the rod 22, and may be replaced whenever desired.

A bell crank 32 is pivotally supported by one of its arms 33 upon standards 34 which are mounted on the floor 24 of the vehicle. The other arm 35 of the bell crank 32 connects with a link 36 which is pivotally connected with the bottom end of the bolt 16. The arm 33 of the bell crank 32 is provided with a radially projecting arm 38 which extends over and against the rear end 39 of said lever 27. When the accelerator pedal 11 is pressed downwards the lever 27 will be pivoted so that the rear end 39 moves the radially projecting arm 38 turning the bell crank 32 which pulls downwards on the link 36 and moves the bolt downwards from the ratchet tooth member 15. This releases the emergency brake 14. A spring 40 is connected with the ratchet tooth member 15 for urging the emergency brake into open condition. When the brake is reset, the ratchet tooth member 15 must be moved back to its original position so that it may again be held by the bolt 16. A spring 41 connects with the lever 27 and with the floor board 42 of the motor vehicle 10 and acts to normally urge the front end 28 of the lever against the accelerator pedal 11.

A solenoid 44 is mounted upon the floor 24 of the motor vehicle and is provided with a core 45 which is resiliently extended. An expansion spring 46 urges the core 45 outwards. This expansion spring 46 is mounted within the solenoid 44. A removable back plate 47 holds the spring 46 in position. The front end of the core 45 slidably and non-rotatively engages the stationary rod 22. More specifically, the stationary rod 22 is provided with a square or other non-circular section 48 which engages in a complementary shaped opening 49 formed in the outer end of the core 45.

A tapered clutch member 50 having an externally serrated face is rotatively mounted upon the outer end of the core 45 and normally engages a serrated clutch section 51 coaxially formed upon the pivot of the lever 27. The tapered clutch member 50 is held from coming off of the outer end of the core 45 by a small flange 53. It is held from moving inwards by a large flange 54 against its back face. This large flange 54 is formed with ratchet teeth 55. A pawl 56 is mounted on the back face of the clutch member 50 and is urged into engagement with the ratchet teeth 55 by a small leaf spring 57. The pawl 56 and ratchet teeth 55 free the clutch member 50 to turn in one direction relative to the core 45.

The coil of the solenoid 44 is illustrated in Fig. 6 and is indicated by the reference numeral 59. This coil is connected in series with the ignition lock switch 12 and with the battery 60 of the motor vehicle.

The operation of the automatic emergency brake release is as follows:

Normally the accelerator pedal 11 is in its raised position. It cannot be maintained in a depressed condition, unless it is held depressed. The spring 41 pivots the lever 27 clockwise in relation to Fig. 1. The pawl 56 and ratchet teeth 55 are so directed that the lever 27 is free to be moved up the spring 41, and consequently the accelerator pedal 11 will always assume a raised position when it is released.

If the ignition lock 12 is off, no current flows through the solenoid 44. The spring 46 then extends the core 45 so that the tapered clutch member 50 engages the complementary clutch element 51 formed or mounted on the lever 27. The lever 27 is in a locked condition and can not pivot. The accelerator pedal 11 now is locked. It can not be pressed down because it rests against the lever 27 which is locked. The lever 27 cannot turn counterclockwise because the clutch element 51 fixedly connects it with the clutch member 50 which in turn is non-rotatively connected by the pawl 56 and ratchet teeth 55 with the score 45 of the solenoid and the core 45 is non-rotatively connected by the socket 49 and non-circular portion 48 with the stationary rod 22.

When the ignition lock 12 is turned on, current will flow through the coil 29 and cause the core 45 to move slightly inwards so that the tapered clutch member 50 is free from the clutch element 51, freeing the lever 27. The accelerator pedal 11 may now be depressed. Therefore as soon as the operator starts up the motor of the vehicle and depresses pedal 11, the emergency brake will be released.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a vehicle having a depressible accelerator pedal, an emergency brake having a member with ratchet teeth for engagement by a bolt for holding said brake set, and an ignition switch, means for releasing said brake when said pedal is depressed, means for latching said pedal in a raised position, solenoid controlled means for releasing said latching means, and a circuit including said ignition switch of said vehicle for operating said solenoid controlled means.

2. In combination with a vehicle having a depressible accelerator pedal, an emergency brake having a member with ratchet teeth for engagement by a bolt for holding said brake set, and an ignition switch, means for releasing said brake when said pedal is depressed, means for latching said pedal in a raised position, solenoid controlled means for releasing said latching means, and a circuit including said ignition switch of said vehicle for operating said solenoid controlled means, said means for releasing said brake including a bolt engaging ratchet teeth formed on a member of said brake.

3. In combination with a vehicle having a depressible accelerator pedal, an emergency brake having a member with ratchet teeth for engagement by a bolt for holding said brake set, and an ignition switch, means for releasing said brake when said pedal is depressed, means for latching said pedal in a raised position, solenoid controlled means for releasing said latching means, and a circuit including said ignition switch of said vehicle for operating said solenoid controlled means, said means for latching said pedal including a clutch member engageable with a complementary clutch element on a lever having one end engaging beneath said pedal, and means for latching said lever.

4. In combination with a vehicle having a depressible accelerator pedal and an emergency brake having a member with ratchet teeth for engagement by a bolt for holding said brake set, a spring urged bolt engaging said ratchet teeth, a stationary horizontal rod transversely of and to the front of said pedal, a lever pivotally mounted on said rod and having its front end engaging against the bottom of said pedal, a bell crank pivotally supported by one of its arms, a link connecting the other arm of said bell crank with said bolt, a radial arm projecting from the second mentioned arm of said bell crank and extending over and against the rear end of said lever, a solenoid having a resiliently extended core with its outer end coaxially with and slidably connected with said stationary rod, a tapered clutch member rotatively mounted on said core and normally engaging a complementary clutch element coaxially of the pivot of said lever, a pawl and ratchet connecting said clutch member with said core freeing said pedal to idle upwards, and a switch for energizing said solenoid for disconnecting said clutch member from said clutch element.

5. In combination with a vehicle having a depressible accelerator pedal and an emergency brake having a member with ratchet teeth for engagement by a bolt for holding said brake set, a spring urged bolt engaging said ratchet teeth, a stationary horizontal rod transversely of and to the front of said pedal, a lever pivotally mounted on said rod and having its front end engaging against the bottom of said pedal, a bell crank pivotally supported by one of its arms, a link connecting the other arm of said bell crank with said bolt, a radial arm projecting from the second mentioned arm of said bell crank and extending over and against the rear end of said lever, a solenoid having a resiliently extended core with its outer end coaxially with and slidably connected with said stationary rod, a tapered clutch member rotatively mounted on said core and normally engaging a complementary clutch element coaxially of the pivot of said lever, a pawl and ratchet connecting said clutch member with said core freeing said pedal to idle upwards, and a switch for energizing said solenoid for disconnecting said clutch member from said clutch element, said bolt engaging through a housing and said spring being located within said housing and acting between the housing and a pin on said bolt.

6. In combination with a vehicle having a depressible accelerator pedal and an emergency brake having a member with ratchet teeth for engagement by a bolt for holding said brake set, a spring urged bolt engaging said ratchet teeth, a stationary horizontal rod transversely of and to the front of said pedal, a lever pivotally mounted on said rod and having its front end engaging against the bottom of said pedal, a bell crank pivotally supported by one of its arms, a link connecting the other arm of said bell crank with said bolt, a radial arm projecting from the second mentioned arm of said bell crank and extending over and against the rear end of said lever, a solenoid having a resiliently extended core with its outer end coaxially with and slidably connected with said stationary rod, a tapered clutch member rotatively mounted on said core and normally engaging a complementary clutch element coaxially of the pivot of said lever, a pawl and ratchet connecting said clutch member with said core freeing said pedal to idle upwards, and a switch for energizing said solenoid for disconnecting said clutch member from said clutch element, said horizontal rod being provided with a non-circular end portion engaging a complementary recess formed in said core by which said core is slidably connected with said stationary rod.

7. In combination with a vehicle having a depressible accelerator pedal and an emergency brake having a member with ratchet teeth for engagement by a bolt for holding said brake set, a spring urged bolt engaging said ratchet teeth, a stationary horizontal rod transversely of and to the front of said pedal, a lever pivotally mounted on said rod and having its front end engaging against the bottom of said pedal, a bell crank pivotally supported by one of its arms, a link connecting the other arm of said bell crank with said bolt, a radial arm projecting from the second mentioned arm of said bell crank and extending over and against the rear end of said lever, a solenoid having a resiliently extended core with its outer end coaxially with and slidably connected with said stationary rod, a tapered clutch member rotatively mounted on said core and normally engaging a complementary clutch element coaxially of the pivot of said lever, a pawl and ratchet connecting said clutch member with said core freeing said pedal to idle upwards, and a switch for energizing said solenoid for disconnecting said clutch member from said clutch element, said stationary rod being provided for a flange engaging said lever in the nature of a thrust bearing for holding said lever from sliding on the rod.

8. In combination with a vehicle having a depressible accelerator pedal and an emergency brake having a member with ratchet teeth for engagement by a bolt for holding said brake set, a spring urged bolt engaging said ratchet teeth, a stationary horizontal rod transversely of and to the front of said pedal, a lever pivotally mounted on said rod and having its front end engaging against the bottom of said pedal, a bell crank pivotally supported by one of its arms, a link connecting the other arm of said bell crank with said bolt, a radial arm projecting from the second mentioned arm of said bell crank and extending over and against the rear end of said lever, a solenoid having a resiliently extended core with its outer end coaxially with and slidably connected with said stationary rod, a tapered clutch member rotatively mounted on said core and normally engaging a complementary clutch element coaxially of the pivot of said lever, a pawl and ratchet connecting said clutch member with said core freeing said pedal to idle upwards, and a switch for energizing said solenoid for disconnecting said clutch member from said clutch element, said core being provided with flanges located adjacent the faces of said tapered member for rotatively supporting said clutch member.

HAROLD MORAN.